United States Patent
Lin et al.

(10) Patent No.: US 8,232,793 B2
(45) Date of Patent: Jul. 31, 2012

(54) METHOD AND APPARATUS OF LOAD DETECTION FOR A PLANAR WIRELESS POWER SYSTEM

(75) Inventors: Jenshan Lin, Gainesville, FL (US); Zhen Ning Low, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 594 days.

(21) Appl. No.: 12/209,784

(22) Filed: Sep. 12, 2008

(65) Prior Publication Data

US 2010/0066349 A1    Mar. 18, 2010

(51) Int. Cl.
*G01R 1/20* (2006.01)
*G01R 15/18* (2006.01)
(52) U.S. Cl. .......................... 324/126; 324/127
(58) Field of Classification Search .................. None
See application file for complete search history.

(56) References Cited

U.S. PATENT DOCUMENTS

| | | | |
|---|---|---|---|
| 7,923,870 B2* | 4/2011 | Jin | 307/140 |
| 2003/0052684 A1* | 3/2003 | Nelson et al. | 324/329 |
| 2007/0005118 A1* | 1/2007 | Carter et al. | 607/57 |
| 2009/0284245 A1* | 11/2009 | Kirby et al. | 323/318 |
| 2010/0072825 A1* | 3/2010 | Azancot et al. | 307/104 |

FOREIGN PATENT DOCUMENTS

| | | |
|---|---|---|
| JP | 2007-231586 A | 8/1995 |
| KR | 10-2006-003152 A | 4/2006 |
| KR | 10-2006-0122492 A | 11/2006 |
| KR | 10-0792310 B1 | 1/2008 |

OTHER PUBLICATIONS

International Search Report and Written Opinion, dated May 4, 2010.

* cited by examiner

*Primary Examiner* — Roberto Velez
(74) *Attorney, Agent, or Firm* — Thomas, Kayden, Horstemeyer & Risley, LLP

(57) ABSTRACT

Embodiments of the subject invention relate to a method and apparatus for determining information regarding a load in a planar wireless power transfer system by extracting system operating parameters from one or more test points in the transmitter circuit. As shown in FIG. 1, a specific embodiment showing three test points in the transmitter circuit from which operating parameters can be extracted. The transmitter circuit is designed to produce a magnetic field, by driving the transmitter coil, which inductively couples to a receiver coil such that power is provided to a receiver. By extracting operating parameters from the transmitter circuit, the receiver does not need to incorporate sophisticated signal processing and can be manufactured with low cost.

44 Claims, 5 Drawing Sheets

METHOD AND APPARATUS OF LOAD DETECTION FOR A PLANAR WIRELESS POWER SYSTEM

BACKGROUND OF INVENTION

Portable electronic devices such as laptop computers, LCD digital photo frames, mobile phones, and mp3 players require power to operate. Often, these devices use rechargeable batteries to provide power. The batteries are typically recharged by plugging a charger into the portable device or by removing the battery from the portable device and separately recharging the battery using a wired charger.

The cables that once restricted electronic devices are gradually being rendered unnecessary by wireless communication technology, and as the circuits that constitute the electronic devices shrink, only the power cords and batteries continue to restrict the portability of mobile electronic devices.

Current trends are leading towards going completely wireless. This means that portable devices can remain portable and can avoid having to 'plug-in' for power charging. Electromagnetic inductive charging uses a coil to create an electromagnetic field across a charging station surface. The device then converts power from the electromagnetic field back into usable electricity, which is put to work charging the battery. Two coils are brought close to each other and when current is passed through one, the generated magnetic flux causes electromotive force to be generated in the other.

In order to reduce unnecessary generation of magnetic flux, for example when no receiver is positioned to receive the magnetic flux or when the battery associated with the receiver is already charged, techniques to determine whether a valid load is placed in position with respect to the transmitting coil and to determine the charging status of the load have been developed. In order to determine if a valid load is placed on the transmitting coil and to determine the charging status, a communication link is often used between the transmitting unit and the receiving unit. Such a link is often also used to determine whether multiple loads are placed on the transmitter. However, a communication link adds cost and size to the system, which is not desirable for a compact receiving unit to be integrated inside a portable device. Alternatively, a communication system, such as a complex DSP system, can be used to extract system operating parameters from the transmitter to determine the operating status of the system. However, such systems are typically complicated and consume large amounts of power which reduce system efficiency and increase system cost.

Accordingly, there still exists a need in the art for an efficient method and apparatus to determine whether a valid load is positioned to be charged and the charging status of the load.

BRIEF SUMMARY

Embodiments of the subject invention relate to a method and apparatus for determining information regarding a load in a planar wireless power transfer system by extracting system operating parameters from one or more test points in the transmitter circuit. As shown in FIG. 1, a specific embodiment includes three test points in the transmitter circuit from which operating parameters can be extracted. The transmitter circuit is designed to produce a magnetic field, by driving the transmitter coil, which inductively couples to a receiver coil such that power is provided to a receiver. By extracting operating parameters from the transmitter circuit, the receiver does not need to incorporate sophisticated signal processing and can be manufactured with low cost.

Test point 1 in FIG. 1 shows where the supply current of the system can be measured. The embodiment shown in FIG. 1 uses a current sense resistor and a differential amplifier located on the high side of the power supply to measure the transmitter supply current. In an alternative embodiment, the transmitter supply current can be measured on the low side of the power supply. Other techniques can also be used. The output voltage of the differential amplifier, which is proportional to the supply current, is then fed into the analog-to-digital conversion (ADC) port of a processor.

Test point 2 in FIG. 1 shows where the RMS coil voltage can be measured. The embodiment shown in FIG. 1 extracts the RMS coil voltage by rectifying the coil voltage across a diode and holding the charge using a charge holding capacitor. A resistor can be added in parallel to the capacitor to control the response time of the circuit. Other techniques can also be used to extract the RMS coil voltage. The rectified DC voltage is then fed into the ADC port of a processor.

Test point 3 in FIG. 1 shows where the RMS coil current of the coil can be measured. The RMS coil current can be extracted before or after the coil. The embodiment shown in FIG. 1, which is positioned after the coil, transforms the coil current to its voltage equivalent by using a current sense resistor and a differential amplifier. A diode charge holding capacitor is then used to further extract the RMS coil current. A resistor can be added in parallel to the capacitor to control the response time of the circuit. The rectified DC voltage is then fed into the ADC port of a processor. Other techniques can also be used to extract the RMS coil current.

DETAILED DISCLOSURE

Figure 1:
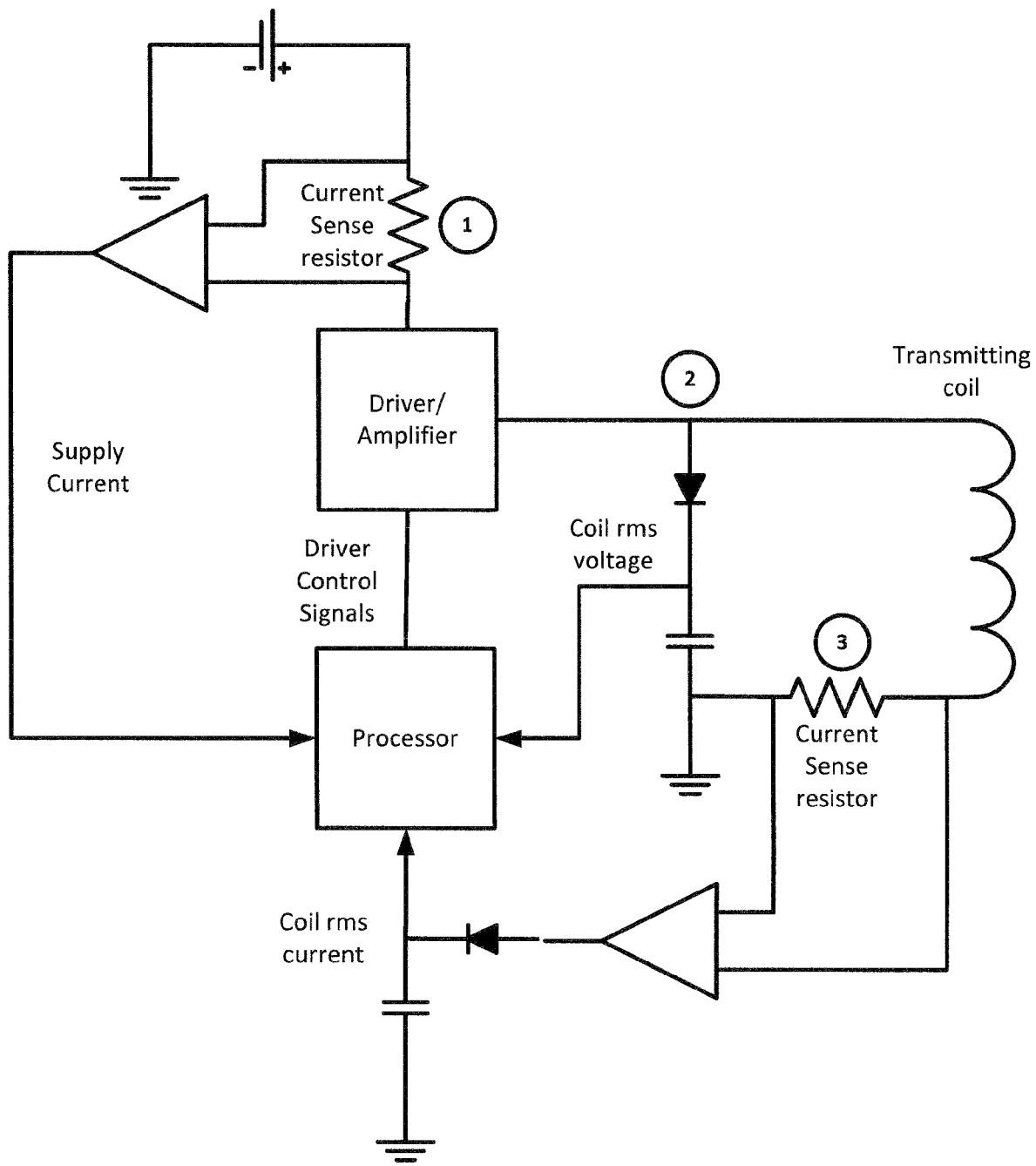
FIG. 1 shows a system block diagram for system operating parameters extraction in accordance with an embodiment of the subject invention.

Embodiments of the subject invention relate to a method and apparatus for determining information regarding a load in a planar wireless transfer system by extracting system operating parameters from one or more test points in the transmitter circuit. As shown in FIG. 1, a specific embodiment includes three test points in the transmitter circuit from which operating parameters can be extracted. The transmitter circuit is designed to produce a magnetic field, by driving the transmitter coil, which inductively couples to a receiver coil such that power is provided to a receiver. By extracting operating parameters from the transmitter circuit, the receiver does not need to incorporate sophisticated signal processing and can be manufactured with low cost.

Test point 1 in FIG. 1 shows where the supply current of the system can be measured. The embodiment shown in FIG. 1 uses a current sense resistor and a differential amplifier located on the high side of the power supply to measure the transmitter supply current. In an alternative embodiment, the transmitter supply current can be measured on the low side of the power supply. Other techniques can also be used. The output voltage of the differential amplifier, which is proportional to the supply current, is then fed into the analog-to-digital conversion (ADC) port of a processor.

Test point 2 in FIG. 1 shows where the RMS coil voltage can be measured. The embodiment shown in FIG. 1 extracts the RMS coil voltage by rectifying the coil voltage across a diode and holding the charge using a charge holding capacitor. A resistor can be added in parallel to the capacitor to control the response time of the circuit. Other techniques can also be used to extract the RMS coil voltage. As an example, the real time AC voltage can be measured with a fast enough ADC. The rectified DC voltage is then fed into the ADC port of a processor.

Test point 3 in FIG. 1 shows where the RMS coil current of the coil can be measured. The RMS coil current can be extracted before or after the coil. The embodiment shown in FIG. 1, which is positioned after the coil, transforms the coil current to its voltage equivalent by using a current sense resistor and a differential amplifier. A diode charge holding capacitor is then used to further extract the RMS coil current. The diode can be removed by using a fast ADC. A resistor can be added in parallel to the capacitor to control the response time of the circuit. The rectified DC voltage is then fed into the ADC port of a processor. Other techniques can also be used to extract the RMS coil current. As an example, a loop can be used to measure the AC current.

Figure 2:
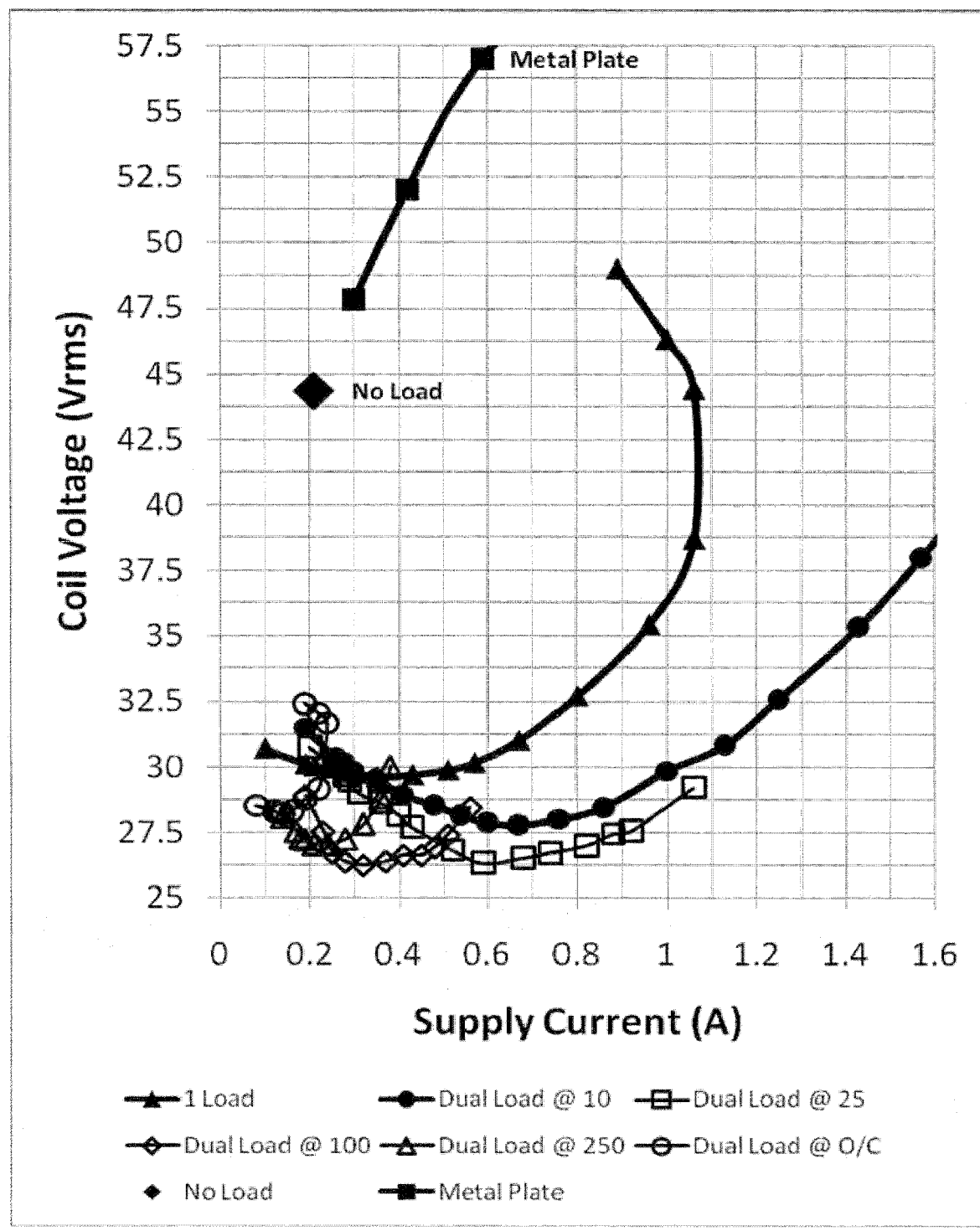
FIG. 2 shows measurement results of RMS coil voltage and supply current space diagram in accordance with an embodiment of the subject invention.
Figure 3:
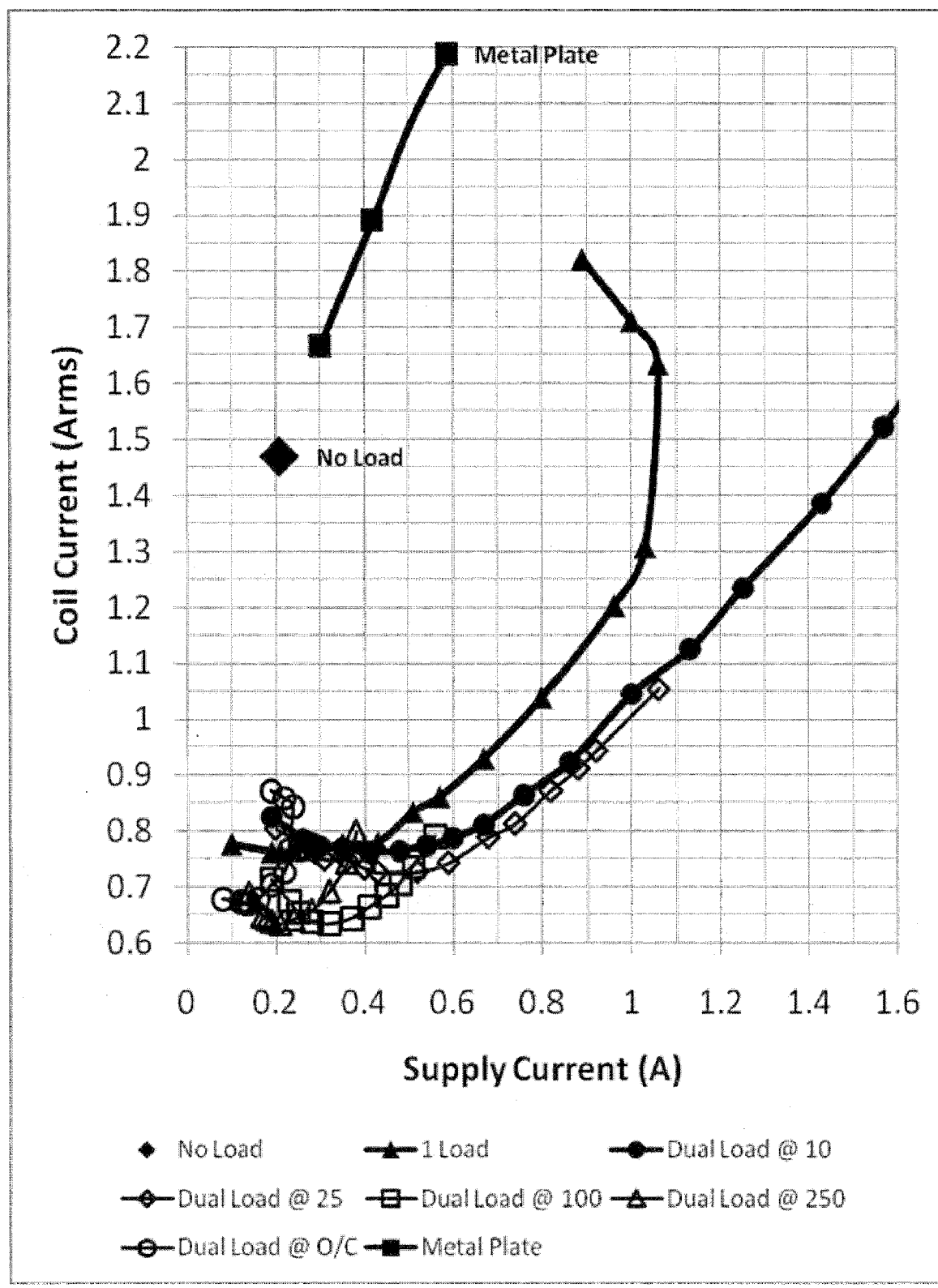
FIG. 3 shows measurement results of RMS coil current and supply current space diagram in accordance with an embodiment of the subject invention.

FIG. 2 shows the coil RMS voltage and supply current space diagram of the operation of an embodiment of a planar wireless power transfer system measured in accordance with an embodiment of the invention. FIG. 3 shows the coil RMS current and supply current space diagram of the operation of the wireless power transfer system measured in accordance with an embodiment of the invention. As the threshold and location of the various regions in the space diagrams of FIG. 2 and FIG. 3 depend primarily on the size of the transmitter coil and supply voltage of the transmitter, each transmitter can have different thresholds and locations of regions. In a specific embodiment, the coil voltage or the coil current can be used to track the charge status of the load and/or whether the load is operation properly. The method and system are able to determine invalid load conditions such as no load and a metal sheet, and distinguish them clearly from normal operation with a valid load. This is because the distance between the invalid load conditions and valid load conditions is large in either the coil RMS voltage and supply current space diagram or coil RMS current and supply current space diagram. In one embodiment, the system extracts supply current and coil RMS voltage. In another embodiment, the system extracts supply current and coil RMS current. In a further embodiment, the system extracts all three of the parameters. Measurements of these parameters at a point in time can be used to determine whether there is a valid load, or not, proximate the transmitter coil, or whether there is a fault condition by comparing the measurements to a known space diagram such as in FIG. 2 or FIG. 3.

Figure 4:
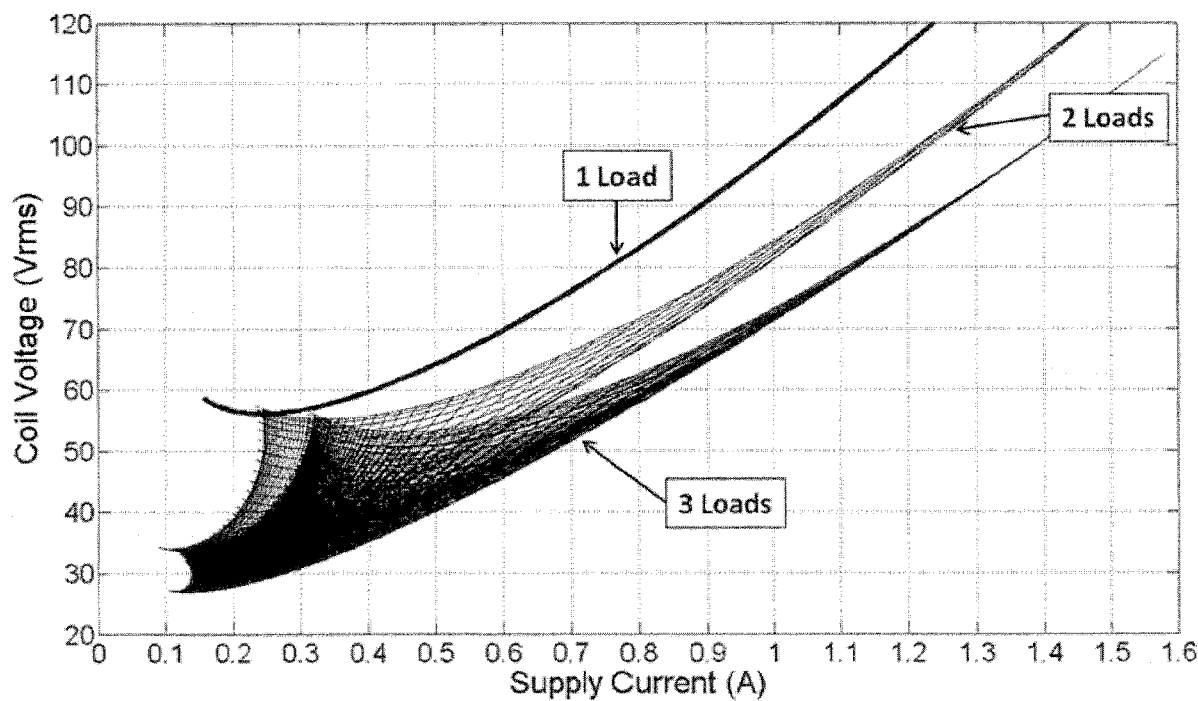
FIG. 4 shows simulation results of system operation for different number of loads in accordance with an embodiment of the subject invention.

In addition, it is possible to differentiate the number of loads being placed on the transmitting pad by comparing with either space diagram. An example is shown in FIG. 4. It should be noted that there are overlaps of certain load conditions but they occur at very light loads (low current). Light load operation does not occur during the power-up state. Therefore, the system is able to easily detect the number of loads on the transmitting coil when powering up. Adding or removing a receiver from the transmitting coil can also be detected by observing any sharp transitions in either space diagram. The direction of the transition can be used to determine if a receiver is added or removed from the transmitting coil.

Figure 5:
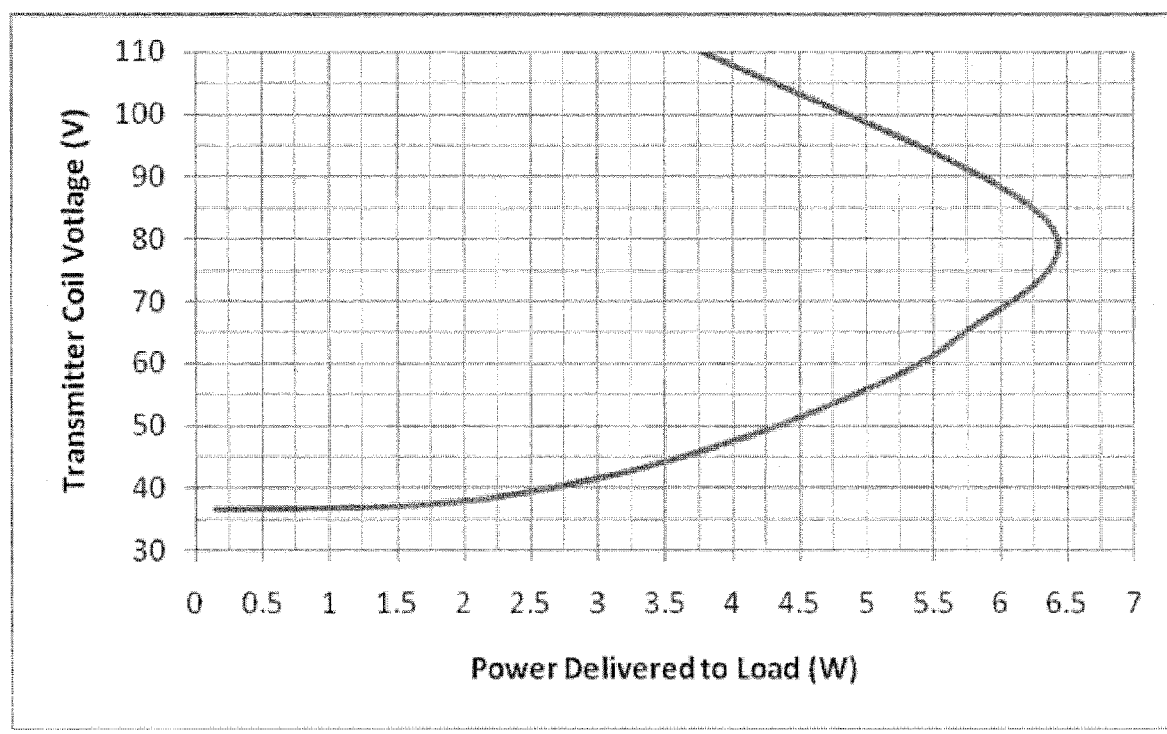
FIG. 5 shows power delivery versus transmitting coil voltage in accordance with an embodiment of the subject invention.

Power delivered and other system operating parameters can be determined by the coil RMS voltage. FIG. 5 shows the direct correlation between the coil RMS voltage and the power delivered to the load. FIG. 5 was produced by using a variable resistor as the load, which models the behavior of a battery charging for the portion of the curve below about 70V. As the battery begins charging, the space diagram would read about 70V, 6 W and would tend to go down and to the left as charging proceeded. In this way, measuring the coil voltage over a period of time and comparing with a curve such as shown in FIG. 5 for the receiver, a determination of the charging status of the load, and/or type of load, can be made. In another embodiment, a plot of transmitter coil current versus power delivered to load (W) can be used to also determine the charge status of a load, and/or the type of load, based on the measurement of coil current over a period of time. In this way, having prior knowledge of the coil voltage versus power delivered, or the coil current versus power delivered, for a receiver can allow the determination of the charging status for the receiver by measuring coil voltage, or coil current, respectively.

In a further embodiment, power delivered can be determined by measuring the coil voltage or the coil current and using, for example, a look up table and microprocessor to determine power delivered, and charge status from following power delivered.

The information regarding the load can be used to modify the behavior of the transmitter. As examples, if a faulty load is determined the transmitter can be shut off to prevent damage, if a charged load is determined, the transmitter can shut off and come on in intervals to check for new loads, if no load is determined then the transmitter can be shut off until a load is determined.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of determining information regarding a load for a planar wireless power transfer system, comprising: driving a transmitter coil of a planar wireless power transfer system with a drive amplifier; measuring a transmitter coil voltage provided by the drive amplifier to the transmitter coil, wherein the transmitter coil voltage is measured from a circuit physically and directly connected in parallel with the transmitter coil, the circuit comprising a diode and a capacitor; and determining information regarding a load positioned proximate to the transmitter coil based at least in part upon the measured transmitter coil.

2. The method according to claim 1, wherein determining information regarding the load proximate the transmitter coil comprises comparing the transmitter coil voltage over a period of time with an a priori curve in the transmitter coil voltage and power delivered to load space.

3. The method according to claim 1, further comprising:
   measuring a transmitter supply current provided to the drive amplifier.

4. The method according to claim 3, wherein the transmitter supply current is measured on a high side of a power supply, wherein the power supply supplies power to the drive amplifier.

5. The method according to claim 4, wherein the transmitter supply current is measured via a current sensing resistor.

6. The method according to claim 5, wherein the transmitter supply current is measured via an amplifier across the current sensing resistor.

7. The method according to claim 3, wherein the transmitter supply current is measured on a low side of a power supply, wherein the power supply supplies power to the driver amplifier.

8. The method according to claim 7, wherein the transmitter supply current is measured via a current sensing resistor.

9. The method according to claim 8, wherein the transmitter supply current is measured via an amplifier across the current sensing resistor.

10. The method according to claim 3, wherein the transmitter coil voltage is measured at a high side of the transmitter coil.

11. The coil method according to claim 10, wherein the transmitter coil voltage is measured via a rectification circuit.

12. The method according to claim 11, wherein the rectification circuit comprises a diode and a charge holding capacitor.

13. The method according to claim 3, wherein information regarding the load is determined via analysis of the transmitter supply current and the transmitter coil voltage space.

14. The method according to claim 3, further comprising: measuring a transmitter coil current passing through the transmitter coil.

15. The method according to claim 14, wherein information regarding the load is determined via analysis of the transmitter supply current, the transmitter coil voltage, and the transmitter coil current space.

16. The method according to claim 3, wherein the transmitter supply current is measured over a period of time, wherein the transmitter coil voltage is measured over the period of time.

17. The method according to claim 16, wherein the information regarding the load comprises the charge status of the load.

18. The method according to claim 3, wherein the information regarding the load comprises the charge status of the load.

19. The method according to claim 3, wherein the information regarding the load comprises whether the load is operating properly.

20. The method according to claim 3, wherein the information regarding the load comprises whether a valid load is proximate to the transmitter coil.

21. The method according to claim 3, wherein the transmitter supply current and the transmitter coil voltage are measured at a point in time, wherein the information regarding the load is whether there is no load, a valid load, or a faulty load.

22. The method according to claim 3, wherein the transmitter supply current and the transmitter coil voltage are measured at a point in time, wherein the information regarding the load is whether the load is operating properly.

23. The method according to claim 1, wherein the information regarding the load is the charging status of the load.

24. A method of determining information regarding a load for planar wireless power transfer system, comprising: driving a transmitter coil of a planar wireless power transfer system with a drive amplifier; measuring a transmitter coil current passing through the transmitter coil, wherein the transmitter coil current is measured from a circuit connected across a resistor that is physically and directly connected in series with the transmitter coil, the circuit comprising a differential amplifier, a diode, and a capacitor; and determining information regarding a load positioned proximate to the transmitter coil based at least in part upon the measured transmitter coil current.

25. The method according to claim 24, wherein determining information regarding the load proximate the transmitter coil comprises comparing the transmitter coil current over a period of time with a priori curve in the transmitter coil current and power delivered to load space.

26. The method according to claim 24, further comprising:
measuring a transmitter supply current provided to the drive amplifier.

27. The method according to claim 26, wherein the transmitter coil current is measured on high side of the transmitting coil.

28. The coil method according to claim 27, wherein the transmitter coil current is measured via a current sensing resistor.

29. The method according to claim 28, wherein the transmitter coil current is measured via an amplifier across the current sensing resistor.

30. The method according to claim 29, wherein an output of the amplifier is input into a rectification circuit.

31. The method according to claim 30, wherein the rectification circuit comprises a diode and a charge holding capacitor.

32. The method according to claim 26, wherein the transmitter coil current is measured at a low side of the transmitting coil.

33. The method according to claim 32, wherein the transmitter coil current is measured via a current sensing resistor.

34. The method according to claim 33, wherein the transmitter coil current is measured via an amplifier across the current sensing resistor.

35. The method according to claim 34, wherein an output of the amplifier is input to a rectification circuit.

36. The method according to claim 35, wherein the rectification circuit comprises a diode and a charge holding capacitor.

37. The method according to claim 26, wherein information regarding the load is determined via analysis of the transmitter supply current and the transmitter coil current space.

38. The method according to claim 26, wherein the transmitter supply current is measured over a period of time, wherein the transmitter coil current is measured over a period of time.

39. The method according to claim 38, wherein the information regarding the load comprises the charge status of the load.

40. The method according to claim 26, wherein the information regarding the load comprises the charge status of the load.

41. The method according to claim 26, wherein the information regarding the load comprises whether the load is operating properly.

42. The method according to claim 26, wherein the information regarding the load comprises whether a valid load is proximate to the transmitter coil.

43. The method according to claim 26, wherein the transmitter supply current and the transmitter coil current are measured at a point in time, wherein the information regarding the load is whether there is no load, a valid load, or a faulty load.

44. The method according to claim 26, wherein the transmitter supply current and the transmitter coil current are measured at a point in time, wherein the information regarding the load is whether the load is operating properly.

* * * * *